UNITED STATES PATENT OFFICE.

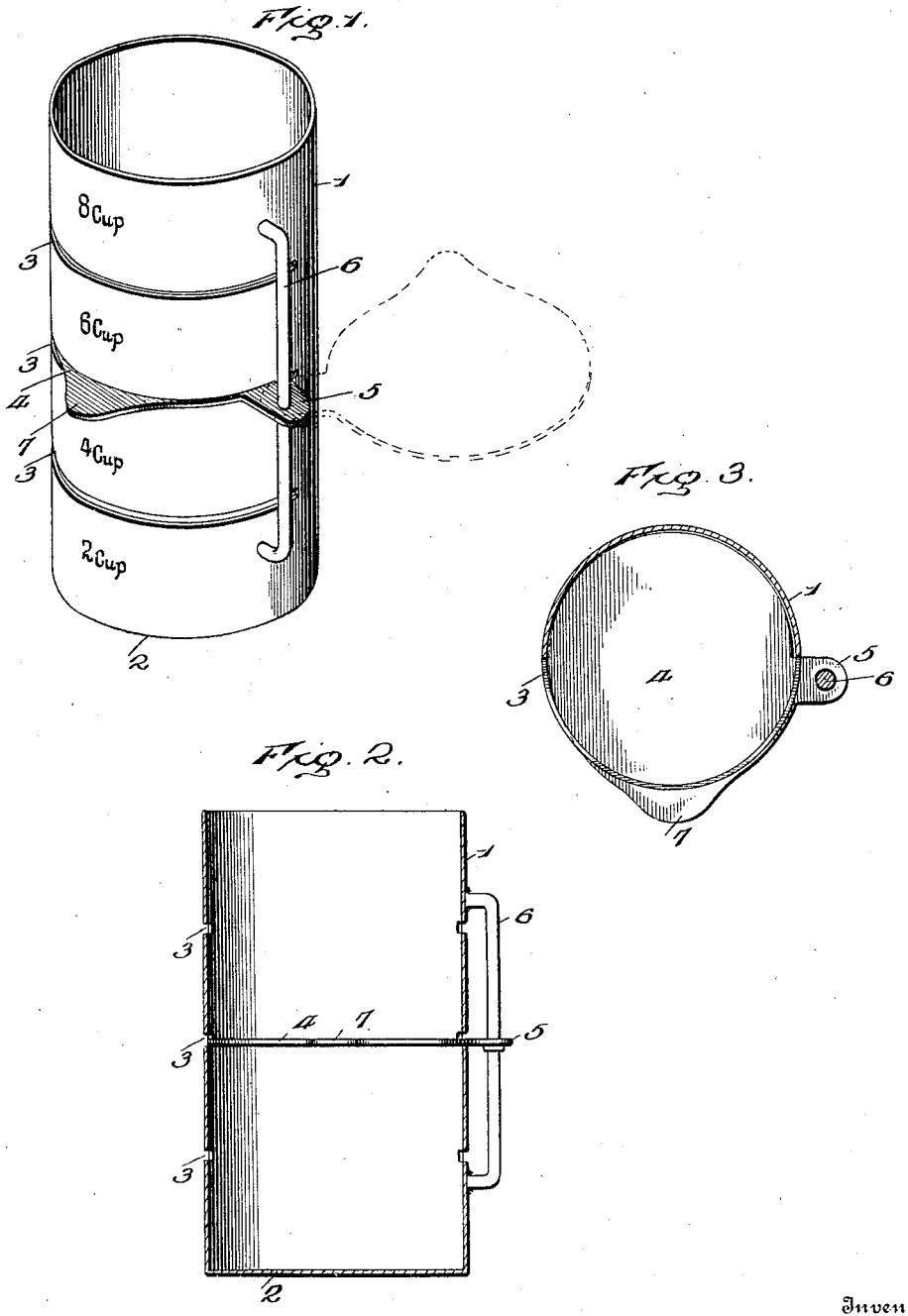

ORRIN E. DICKESON, OF OSKALOOSA, IOWA.

MEASURING DEVICE.

No. 897,458.  Specification of Letters Patent.  Patented Sept. 1, 1908.

Application filed January 28, 1908. Serial No. 413,117.

*To all whom it may concern:*

Be it known that I, ORRIN E. DICKESON, citizen of the United States, residing at Oskaloosa, in the county of Mahaska and State of Iowa, have invented certain new and useful Improvements in Measuring Devices, of which the following is a specification.

This invention comprehends certain new and useful improvements in measuring cups or receptacles, and the invention has for its object a simple, and efficient construction of adjustable measuring device for comminuted, granular, or pulverulent substances, such as coffee, small grains or the like, and the invention consists in certain constructions, and arrangements of the parts that I shall hereinafter fully describe and claim.

For a full understanding of the invention, reference is to be had to the following description and accompanying drawings, in which:

Figure 1 is a perspective view of my improved measuring device; Fig. 2 is a central vertical sectional view thereof; and, Fig. 3 is a horizontal sectional view, the section being taken just above the slide.

Corresponding and like parts are referred to in the following description and indicated in all the views of the drawings by the same reference characters.

Referring to the drawing, the numeral 1 designates the body portion of my improved measuring receptacle, which is cylindrical, as shown, and which is formed with a preferably permanent bottom, 2. The body portion 1 is formed with a series of superposed slots 3 which are spaced in a predetermined manner according to the number and size of the measuring compartments which may be of any desired number, and which are formed by a slide 4 which constitutes an adjustable closure or lid for the receptacle, and which is provided with an apertured ear 5 by which it is retained upon a guide rod 6 and is mounted to swing and slide thereupon. The slots 3 preferably extend throughout one-half of the body portion 1 as shown and the guide rod 6 is soldered or otherwise secured at its angularly disposed upper and lower ends to the body portion above the uppermost slot and below the lowermost slot, as shown.

7 designates a nib or projection which is formed on the disk-like slide or closure 4, preferably at about ninety degrees from the apertured ear 5, said nib constituting a finger piece by which the slide may be swung into and out of the different slots 3.

In the practical operation of my improved measuring receptacle, the same is dipped into the pulverulent or granular substance that it is designed to measure, with the slide 4 in an outwardly swung position, retained on the lower end of the guide rod 6. The slide is then moved upwardly on the guide rod and entered into any one of the slots 3 according to the measure desired, so as to form a closed top for the receptacle and to retain between the same and the bottom 2 the desired quantity of the substance to be measured. With the slide in this position, the receptacle is inverted so as to pour out the substances above the slide, the remainder being retained in the receptacle, and the proper quantity thereby measured. In the present instance, for the purposes of illustration, I have shown my improved measuring device as designed for measuring coffee to make, say, two cups, four cups, six cups, or eight cups, as desired, but it is manifest that the device is not limited to this use, but is equally applicable for use generally for any pulverulent or comminuted substance. By mounting the slide 4 upon the guide rod 6, it will always be at hand and may be readily adjusted up and down and as readily entered into and removed from the proper slot 3, according to the desired measure or quantity of the substances.

From the foregoing description in connection with the accompanying drawing, it will be seen that I have provided a very simple and efficient construction of measuring receptacle that may be cheaply manufactured and easily manipulated for the desired purpose.

Having thus described the invention, what is claimed as new is:

1. As a new article of manufacture, the herein described measuring receptacle comprising a body portion formed with a series of slots one above the other, a vertically disposed guide rod formed with angularly disposed ends connected to the outer side of the body portion, a closed bottom secured to the body portion, and a slide formed with an apertured ear by which it is mounted to swing and slide up and down on the said rod, the said slide being arranged to be entered in any one of the slots in the body portion.

2. As a new article of manufacture, the herein described measuring receptacle, comprising a body portion having a closed bottom and formed with a series of slots one above the other, a vertically disposed guide rod connected to the body portion, and a disk mounted upon said rod and arranged to slide longitudinally and turn thereon and arranged to enter any one of the slots whereby to form a closure for the receptacle above the closed bottom.

In testimony whereof I affix my signature in presence of two witnesses.

ORRIN E. DICKESON. [L. S.]

Witnesses:
  LENA L. ROWE,
  JOHN F. LACEY.